United States Patent
Chaineux et al.

(10) Patent No.: US 8,649,934 B2
(45) Date of Patent: Feb. 11, 2014

(54) METHOD FOR CHECKING THE PLAUSIBILITY OF THE SIGNALS OF A TANK FILLING LEVEL SENSOR

(75) Inventors: Marc Chaineux, Stuttgart (DE); Wilhelm Dueck, Niefern (DE)

(73) Assignee: Robert Bosch GmbH, Stuttgart (DE)

( * ) Notice: Subject to any disclaimer, the term of this patent is extended or adjusted under 35 U.S.C. 154(b) by 245 days.

(21) Appl. No.: 13/155,821

(22) Filed: Jun. 8, 2011

(65) Prior Publication Data

US 2011/0301808 A1 Dec. 8, 2011

(30) Foreign Application Priority Data

Jun. 8, 2010 (DE) .......................... 10 2010 029 775

(51) Int. Cl.
*F02M 37/00* (2006.01)
*G01F 23/00* (2006.01)

(52) U.S. Cl.
USPC ............................................................. 701/34

(58) Field of Classification Search
USPC ........ 701/34, 31.7, 408; 73/290, 291; 702/55; 123/509, 516
See application file for complete search history.

(56) References Cited

U.S. PATENT DOCUMENTS

| | | | | |
|---|---|---|---|---|
| 5,072,615 A | * | 12/1991 | Nawrocki | 73/291 |
| 6,453,881 B1 | * | 9/2002 | Gras | 123/509 |
| 6,625,526 B2 | * | 9/2003 | Gras | 701/31.7 |
| 2002/0156557 A1 | * | 10/2002 | Gras | 701/29 |
| 2004/0064234 A1 | * | 4/2004 | Okamoto | 701/70 |
| 2004/0079150 A1 | * | 4/2004 | Breed et al. | 73/291 |
| 2011/0087398 A1 | * | 4/2011 | Lu et al. | 701/29 |

FOREIGN PATENT DOCUMENTS

DE 10040549 A1 3/2002

* cited by examiner

*Primary Examiner* — Tan Q Nguyen
(74) *Attorney, Agent, or Firm* — Michael Best & Friedrich LLP

(57) ABSTRACT

A method for checking the plausibility of the signals of a tank filling level sensor of a motor vehicle (120) is characterized in that the roadway inclination of the roadway (130) which is traveled on by the motor vehicle (120) is determined, and definitive information about the possibility of using the signals of the tank filling level sensor is obtained as a function of the roadway inclination (N).

7 Claims, 1 Drawing Sheet

METHOD FOR CHECKING THE PLAUSIBILITY OF THE SIGNALS OF A TANK FILLING LEVEL SENSOR

BACKGROUND OF THE INVENTION

The invention relates to a method for checking the plausibility of the signals of a tank filling level sensor of a motor vehicle. The subject matter of the present invention also comprises a computer program and a computer program product with a program code which is stored on a machine-readable carrier, for carrying out the method.

Filling levels of liquids, for example tank filling levels in vehicles, are sensed by tank filling level sensors. In this context, a differentiation is made between tank filling level sensors which carry out continuous, as it were "analog", sensing of the filling level, and filling level sensors which merely sense whether or not liquid is present at a signal generator position, referred to as "discrete" filling level sensors. The former are used, for example, in fuel tanks for vehicles, the latter are preferably used in, for example, supplementary tanks, for example of SCR systems. Existing and future regulations prescribe ever more stringent monitoring of exhaust-gas-related components. For example, in the case of exhaust-gas-related sensors it is therefore necessary to carry out plausibility tests even on filling level sensors, on the basis of which tests it is possible to decide whether or not the respective sensor is functionally capable. In the case of sensors which supply just one discrete signal in the above sense, a second sensor is often installed for the purpose of monitoring safety-critical components.

In modern diesel vehicles, what is referred to as SCR technology is used. This includes the selective catalytic reduction of nitrogen oxides in the exhaust gases of internal combustion engines as well as other combustion installations. The chemical reaction of reduction is selective here. This means that not all exhaust gas components are reduced but rather only the nitrogen oxides ($NO$, $NO_2$). For the reaction to occur, ammonia is required, which is added to the exhaust gas. The products of the reaction are water and nitrogen. In the case of vehicles, the required ammonia is not used in a pure form but rather in the form of an aqueous urea solution, which is known by the trade name "AdBlue". The solution is injected into the exhaust gas train upstream of the SCR catalytic converter, for example by means of a metering pump or an injector. Ammonia and water are produced from the urea/water solution by means of a hydrolytic reaction. The ammonia which is generated in the process can react with the nitrogen oxides in the exhaust gas in a special SCR catalytic converter at an appropriate temperature. The quantity of injected urea is dependent on the (motor engine) nitrogen oxide emission and therefore on the instantaneous rotational speed and the torque of the engine. The consumption of urea/water solution is, depending on the raw emission of the engine, approximately 2 to 8% of the consumed diesel fuel. For this reason, a tank with urea/water solution must be installed in the vehicle, and the filling level in this tank has to be sensed. The tank filling level which is sensed by the filling level signal generator may be falsified here depending on driving states, but also depending on the profile of a section of road. For example, when the vehicle travels on a severe positive gradient or a severe negative gradient an incorrect filling level value may be output by the tank filling level signal generator. In view of the stringent exhaust gas regulations which require, for example, that automobile manufacturers cause the driving capability of a vehicle to be severely restricted if the exhaust gas limiting values can no longer be complied with, it is desirable to sense the tank filling level precisely, independently of the driving state or of the profile of a section of road.

SUMMARY OF THE INVENTION

The invention is therefore based on the object of specifying a method for checking the plausibility of a tank filling level sensor of a motor vehicle, which makes it possible, in particular, to, as it were, "gate out" signals which falsify the filling level.

This object is achieved by means of a method for checking the plausibility of the signals of a tank filling level sensor of a motor vehicle, in which method the roadway inclination of the roadway which is traveled on by the motor vehicle is determined, and definitive information about the possibility of using the signals of the tank filling level sensor is obtained as a function of the roadway inclination.

Since, in particular, the roadway inclination decisively falsifies the filling level signal of a tank filling level signal generator, determining the roadway inclination makes it possible to obtain definitive information about the usability, that is to say about the plausibility, of the tank filling level sensor signals which are output. In particular, it is possible to determine more than just whether the tank is empty, which in purely theoretical terms would be sufficient to rule out a driving capability of the vehicle. The present method provides a possibility of detecting whether the reducing agent in the tank is running low, thereby permitting prompt refilling of the tank. This effectively prevents the situation in which in the event of a restart the driver of a vehicle is subjected, for example, to a starting prohibition, or is surprised by a reduction in torque while driving, or the like.

The basic idea of the present invention is to use a method known per se for sensing the roadway inclination, such as is disclosed, for example, in DE 100 40 549 A1 in order to check the plausibility of the sensor signals of a filling level sensor. For this purpose, the filling level signals are assessed as a function of the determined roadway inclination.

For example, one advantageous refinement of the method provides that the signals are classified as being unusable if the roadway inclination exceeds predefinable values. Roadway inclination in this context may mean either a positive gradient or a negative gradient of the roadway. If the roadway inclination exceeds predefinable values it is possible to assume that there is a positive gradient or a negative gradient with a magnitude such that precise determination of the filling level using the tank filling level signal generator is no longer possible. In addition to vehicle movement dynamics factors which influence the tank filling level, such as for example acceleration processes or deceleration processes and lateral acceleration processes in bends, which respectively occur only briefly, positive gradients or sections of road with negative gradients on which the vehicle is located have an extremely signal-falsifying effect, not least because these events occur over a relatively long time.

In purely principal terms, the inclination could be determined using an inclination sensor. However, this requires additional hardware in the form of the inclination sensor and additional expenditure on circuitry. Furthermore, an additional source of faults arises owing to an additional sensor. The invention is aimed at avoiding additional expenditure on hardware and software and at determining the inclination using a sensor system which is already present per se in the vehicle. According to one advantageous refinement there is provision for the roadway inclination N to be determined by sensing the change in the geodetic altitude $\Delta h$ and the distance Δs which has been traveled by the vehicle in the process, using the following proximity formula:

$$N = \arctan(\Delta h/\Delta s) \cdot 100 [\%]$$

The geodetic altitude can be sensed here using an on-board sensor system which is present in vehicles which are known per se, as described in more detail below.

The change in the geodetic altitude Δh is preferably determined by sensing and storing the current geodetic altitude of the vehicle over the distance which has been traveled by the vehicle and forming the differences between the respectively sensed and stored geodetic altitudes. In this context, at least two reference events the current altitudes and the distance which has been traveled between these two reference events by the vehicle are determined. In this way, the inclination N can be determined on the basis of the formula above.

According to one preferred refinement of the method, the altitude is determined using what is referred to as the international altitude formula in the following way:

$$h(p) = \left(1 - \frac{p^{\frac{1}{5.255}}}{1013.25}\right) \cdot \frac{288.15}{0.0065} [m],$$

where the pressure p is measured in hPa.

The ambient air pressure is determined here using a pressure sensor which is arranged in the vehicle. Such a pressure sensor is present in any case, and its output values are used for controlling the engine. It is therefore possible to dispense with additional hardware in the form of additional sensor systems.

In this context, the ambient air pressure which is sensed by means of the pressure sensor is continuously plotted against, and as a function of, the distance which has been traveled by the vehicle. In this way, continuous determination of the inclination is possible.

Another refinement of the method provides that the changes in the geodetic altitudes and the distance traveled are determined on the basis of GPS data which are acquired by a navigation device of the vehicle. In this way it is even possible to dispense with a pressure sensor.

DETAILED DESCRIPTION

Figure 1:
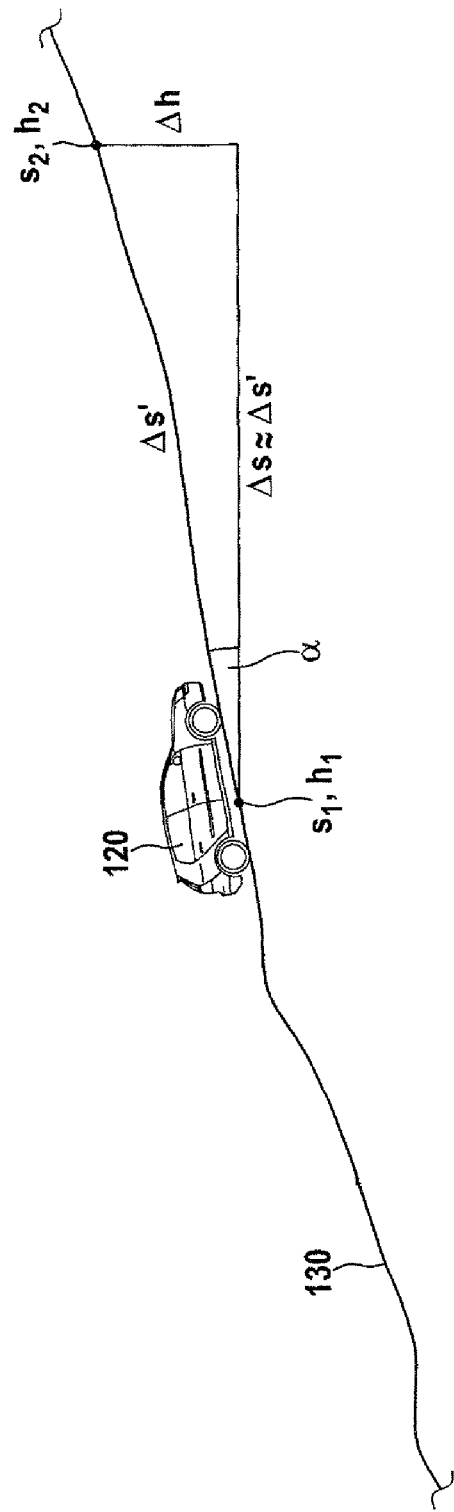
FIG. 1 schematically illustrates a vehicle on an inclined roadway.

In vehicles with SCR systems, tanks are provided for storing urea/water solutions whose filling level is sensed using filling level signal generators. In this context, both continuous and discontinuous filling level signal generators are used. The sensor signals of these filling level signal generators are heavily influenced by vehicle movement dynamics factors, for example acceleration processes and deceleration processes and/or lateral acceleration processes in bends. These vehicle movement dynamics factors very frequently only occur for a limited, brief time. Traveling on sections of road with positive gradients or negative gradients is more problematic. In this case, falsifications of the sensor signals can occur over relatively long time periods.

The basic idea of the invention is to sense such sections of road which falsify the filling level signal generator sensor signal and to perform plausibility checking of the signals of the filling level signal generator. This is done by sensing the profile of the section of road and in particular by sensing the roadway inclination of the roadway which is traveled on by the motor vehicle. Whenever the roadway inclination exceeds a predefinable value, the signals of the tank filling level sensor are classified as being unusable.

The sensing of the roadway inclination is described below in conjunction with the FIGURE. A vehicle 120 moves on an inclined roadway 130, for example on a section of road with a positive gradient, as illustrated in the FIGURE. In this context, the vehicle 120 moves on the inclined roadway 130 over a distance $\Delta s' = s_2 - s_1$. The event point 2 is at a higher geodetic altitude $h_2$ than the event point 1, which has a geodetic altitude $h_1$. The difference in altitude which has been traveled through is therefore $\Delta h = h_2 - h_1$. The inclination of the roadway by the angle α can be determined essentially by a positive gradient triangle, as illustrated in the FIGURE. The following applies here: $\Delta h/\Delta s' = \cos\alpha$ or $\Delta h/\Delta s = \tan\alpha$. Assuming that the length Δs (the adjacent side) and the length Δs' (the hypotenuse) differ only to a small extent at small angles α, $\Delta s' \approx \Delta s$, the inclination N of the roadway can be determined by means of the following formula:

$$N = \arctan(\Delta h/\Delta s) \cdot 100 [\%]$$

or: $N = \arccos(\Delta h/\Delta s) \cdot 100 [\%]$.

where the inclination is given as a percentage. The inclination N of the roadway can be determined using the two functions, wherein it is easier to carry out software calculations with tangent functions than with cosine functions. To this extent, the arctan is preferred in the software implementation of the method. The distance Δs which is which has been traveled can be determined using the signals of the on-board speedometer, and the change in altitude Δh can be determined by measuring the ambient air pressure. In this context, what is referred to as the barometric altitude formula, which describes the reduction in the air pressure as the altitude increases, is used.

For the sake of simplification, the reference altitude is assumed to be sea level, and an average state is presumed for the atmosphere there, as is described by the international standard atmosphere (temperature 15° C.=288.1 K, air pressure 1013.25 hPa, temperature gradient 0.65 K per 100 m). According to these assumptions, the air pressure is described by what is referred to as the international altitude formula for the troposphere, which is valid up to an altitude of 11 km:

$$p(h) = 1013.25 \cdot \left(1 - \frac{0.0065 \cdot h}{288.15}\right)^{5.255}.$$

The pressure here is measured in hPa. By solving this equation for h, the altitude dependence of the ambient air pressure can be determined on the basis of the following formula:

$$h(p) = \left(1 - \frac{p^{\frac{1}{5.255}}}{1013.25}\right) \cdot \frac{288.15}{0.0065}.$$

The altitude is measured here in meters.

The sensing of the ambient air pressure is carried out using pressure sensors which are provided per se in the vehicle for performing engine control. The accuracy of the sensing of the inclination depends on the accuracy of the pressure sensor and on the accuracy of the determination of the distance traveled. The accuracy is, however, limited since the calculation is based on an average atmosphere instead of on the current atmospheric state, but nevertheless it is sufficient for determining relevant increases in the single-digit to double-digit percentage range.

The calculation of the profile of the section of road or of the roadway inclination is performed for the urea reservoir container in a controller with a corresponding piece of software, that is to say with a computer program. In this context, the pressure sensor signals of the engine controller are read out, for example, via a CAN bus. The distance is determined as a time integral over the speed which is also transmitted from the engine controller via a CAN bus. The calculation of the altitude can either be carried out according to the equation above or, in order to minimize the complexity of the calculation, a plurality of points in a relevant altitude range or pressure range can be calculated in advance and stored as a pressure-dependent characteristic curve in the program. During the driving mode, value pairs of the geodetic altitude and of the distance traveled are then continuously determined and the roadway inclination is determined in the prescribed way by forming differences.

As soon as the roadway inclination exceeds predefinable values, the level signals which are output by the filling level signal generator are classified as unusable and gated out. The gating out of the filling level signal generator sensor signals in the case of a severe roadway inclination make it possible to avoid falsifications of the filtered signal owing to the profile of the section of road, without a large filter constant which leads to slow reaction times having to be set. As a result, the sensing of the sensor signals becomes more dynamic and the signal which is actually evaluated can be adopted as a standard signal both for flat sections of road and for sections of road which have a positive gradient, allowing vehicle-specific applications to be simplified.

Yet another refinement of the method provides for the change in the geodetic altitudes and the distance traveled to be determined on the basis of GPS data which are acquired, for example, by a navigation device of the vehicle. In this case it is possible to dispense with a pressure sensor completely.

The method steps above are, as already mentioned, preferably implemented as a computer program which is implemented in a computing device, in particular the controller of an internal combustion engine of the vehicle, and runs there. The method steps can be stored in the form of a program on a data carrier, that is to say on a computer program product. In this way, subsequent reading in of the method into existing controllers is possible. As a result, retrofitting of existing vehicles without additional expenditure on hardware is also possible.

The invention claimed is:

1. A method for checking the plausibility of the signals of a tank filling level sensor of a motor vehicle (120), characterized in that the roadway inclination of the roadway (130) which is traveled on by the motor vehicle (120) is determined, and definitive information about the possibility of using the signals of the tank filling level sensor is obtained as a function of the roadway inclination (N);

the roadway inclination (N) is determined by sensing the change in the geodetic altitude (h) and the distance ($\Delta s$) which has been traveled by the vehicle in the process, using the following proximity formula:

$N = \arctan(\Delta h/\Delta s) \cdot 100[\%]$ or: $N = \arccos(\Delta h/\Delta s) \cdot 100[\%]$;

the change in the geodetic altitude (h) is determined by sensing and storing the current altitude ($h_1$, $h_2$) of the vehicle over the distance ($\Delta s$) which has been traveled by the vehicle (120) and forming the differences ($\Delta h$) between the respectively sensed and stored geodetic altitudes; and, the current altitude (h) is determined on the basis of the sensed ambient air pressure (p) using the international altitude formula:

$$h(p[hPa]) = \left(1 - \frac{p^{\frac{1}{5.255}}}{1013.25}\right) \cdot \frac{288.15}{0.0065}[m].$$

2. The method according to claim 1, characterized in that the signals are classified as being unusable if the roadway inclination (N) exceeds predefinable values.

3. The method according to claim 1, characterized in that the ambient air pressure (p) is determined using a pressure sensor which is arranged in the vehicle.

4. The method according to claim 3, characterized in that the ambient air pressure (p) which is sensed using the pressure sensor is continuously plotted against, and as a function of, the distance which has been traveled by the vehicle (120).

5. The method according to claim 1, characterized in that the changes in the geodetic altitudes (h) and the distance which has been ($\Delta s$) traveled are determined on the basis of GPS data which are acquired by a navigation device of the vehicle.

6. A computer program which carries out all the steps of a method according to claim 1 when it runs on a computing device, in particular a controller, of an internal combustion engine of the vehicle (120).

7. A computer program product with a program code which is stored on a machine-readable carrier, for carrying out the method according to claim 1, when the program is executed on the computer or the controller of the internal combustion engine of the vehicle (120).

* * * * *